(12) United States Patent
Patino et al.

(10) Patent No.: US 7,202,635 B2
(45) Date of Patent: Apr. 10, 2007

(54) METHOD AND SYSTEM FOR CHARGING A BATTERY TO A POINT LESS THAN INITIAL MAXIMUM CAPACITY

(75) Inventors: Joseph Patino, Pembroke Pines, FL (US); Randall S. Fraser, Plantation, FL (US)

(73) Assignee: Motorola, Inc., Schaumburg, IL (US)

( * ) Notice: Subject to any disclaimer, the term of this patent is extended or adjusted under 35 U.S.C. 154(b) by 340 days.

(21) Appl. No.: 10/797,729

(22) Filed: Mar. 10, 2004

(65) Prior Publication Data

US 2005/0200331 A1   Sep. 15, 2005

(51) Int. Cl.
*H01M 10/46* (2006.01)
(52) U.S. Cl. ..................................... 320/160
(58) Field of Classification Search ............... 320/130, 320/132, 160, 162, 164
See application file for complete search history.

(56) References Cited

U.S. PATENT DOCUMENTS

2004/0222768 A1* 11/2004 Moore et al.

* cited by examiner

*Primary Examiner*—Edward H. Tso
(74) *Attorney, Agent, or Firm*—Larry G. Brown (57) ABSTRACT

The invention concerns a method (200) and a system (100) for charging a battery (112). The method includes the steps of determining (214) a charge termination point for the battery, in which the charge termination point produces a charge on the battery that is less than an initial maximum charging capacity of the battery, and charging (224) the battery using the charge termination point for at least a portion of the charge cycles of the battery. The method reduces at least in part the variation of battery capacity over the cycle life of the battery.

16 Claims, 4 Drawing Sheets

METHOD AND SYSTEM FOR CHARGING A BATTERY TO A POINT LESS THAN INITIAL MAXIMUM CAPACITY

BACKGROUND OF THE INVENTION

1. Field of the Invention

This invention relates in general to energy management and more particularly to methods for charging batteries.

2. Description of the Related Art

Portable electronic devices, such as cellular telephones and personal digital assistants, have become very popular in today's marketplace. Virtually all of these devices receive their power from a portable, rechargeable battery. A typical battery of this nature may be charged and discharged hundreds of times over its lifetime, particularly if the device to which the battery supplies power is heavily used.

Presently, when a rechargeable battery is new, the battery can be charged to its maximum capacity, i.e., 100 percent of capacity. As the battery is charged and discharged over the course of its life, however, its charge capacity decreases. For example, after roughly 400 charge/discharge cycles, the battery may only be chargeable to eighty-five percent of its original maximum capacity. As a result, a user may notice that the portable electronic device that receives its power from the battery does not provide as much time for active or standby operations between chargings as the device initially did.

SUMMARY OF THE INVENTION

The present invention concerns a method for charging a battery. The method includes the steps of determining a charge termination point for the battery, in which the charge termination point produces a charge on the battery that is less than an initial maximum charging capacity of the battery, and charging the battery using the charge termination point for at least a portion of the charge cycles of the battery to reduce at least in part the variation of battery capacity over the cycle life of the battery. The step of determining a charge termination point for the battery can include the steps of determining a number of charge cycles, an initial maximum capacity of the battery and a target capacity of the battery; determining a charge factor based on the number of charge cycles; and calculating a charge termination factor based on the charge factor, the initial maximum capacity of the battery and the target capacity of the battery. The charge termination point can be based on the charge termination factor.

In one arrangement, the charge termination point can be a termination charge voltage or a charge current termination point. The method can further include the step of accessing the number of charge cycles, the initial maximum capacity of the battery and the target capacity of the battery from a memory of the battery. As an example, the memory is an electrically erasable programmable read only memory.

In another arrangement, the target capacity of the battery can be selected based on a predetermined percentage of transmission time, a predetermined percentage of receive time or a predetermined percentage of standby time, each of which can be associated with a mobile communications device. The method can also include the step of incrementing the number of charge cycles each time the battery is charged to its charge termination factor.

The present invention also concerns a system for charging a battery. The system includes a battery and a charging unit having a processor. The processor is programmed to determine a charge termination point for the battery in which the charge termination point produces a charge on the battery that is less than an initial maximum charging capacity of the battery. The charging unit charges the battery using the charge termination point for at least a portion of the charge cycles of the battery to reduce at least in part the variation of battery capacity over the cycle life of the battery. The system also includes suitable software and circuitry to carry out the processes described above.

The present invention also concerns a battery for supplying power to an electronic device. The battery includes at least one cell for receiving power from a charging unit and a memory. When the battery is coupled to the charging unit, a processor of the charging unit is programmed to determine a charge termination point for the battery. This charge termination point produces a charge on the battery that is less than an initial maximum charging capacity of the battery. In addition, the charging unit charges the battery using the charge termination point for at least a portion of the charge cycles of the battery to reduce at least in part the variation of battery capacity over the cycle life of the battery.

The present invention also concerns a charging unit for charging a battery. The charging unit includes a charge control circuit for controlling charging current to the battery and a processor. The processor is programmed to determine a charge termination point for the battery in which the charge termination point produces a charge on the battery that is less than an initial maximum charging capacity of the battery. The charging unit charges the battery using the charge termination point for at least a portion of the charge cycles of the battery to reduce at least in part the variation of battery capacity over the cycle life of the battery.

BRIEF DESCRIPTION OF THE DRAWINGS

The features of the present invention, which are believed to be novel, are set forth with particularity in the appended claims. The invention, together with further objects and advantages thereof, may best be understood by reference to the following description, taken in conjunction with the accompanying drawings, in the several figures of which like reference numerals identify like elements, and in which:

DETAILED DESCRIPTION

While the specification concludes with claims defining the features of the invention that are regarded as novel, it is believed that the invention will be better understood from a consideration of the following description in conjunction with the drawing figures, in which like reference numerals are carried forward.

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting but rather to provide an understandable description of the invention.

The terms a or an, as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically. The terms program, software application, and the like as used herein, are defined as a sequence of instructions designed for execution on a computer system. A program, computer program, or software application may include a subroutine, a function, a procedure, an object method, an object implementation, an executable application, an applet, a servlet, a source code, an object code, a shared library/dynamic load library and/or other sequence of instructions designed for execution on a computer system.

Figure 1:
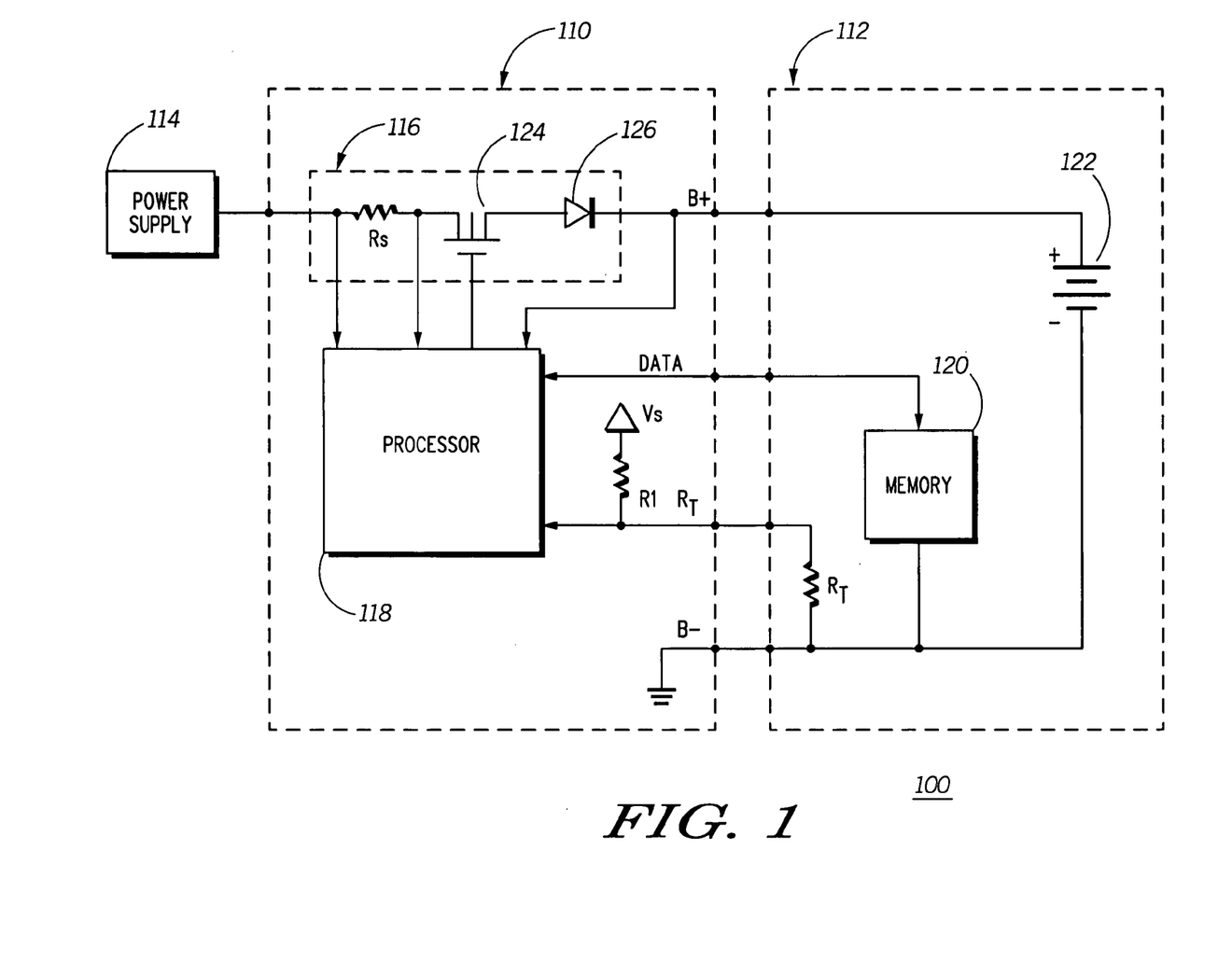
FIG. 1 illustrates a system for charging a battery in accordance with an embodiment of the inventive arrangements.

Referring to FIG. 1, a system 100 for charging a battery is shown. The system 100 can include a charging unit 110, a battery 112 and a power supply 114. The power supply 114 can provide charging current to the charging unit 110, which can feed the charging current to the battery 112. The charging unit 110, as will be explained below, can control the amount of charging current that flows to the battery 112.

The battery 112 can be any type of battery that is suitable for receiving a charging current and for providing power to an electronic device. The charging unit 110 can be any device capable of directing and controlling charging current that flows to the battery 112. As an example, the charging unit 110 can be a mobile communications device—such as a cellular telephone, two-way radio or a personal digital assistant—or a desktop charger that can provide power to a battery for a mobile communications device. Of course, the invention is not limited to these particular examples, as other suitable devices can serve as the charging unit 110.

The charging unit 110 can include, for example, a current control circuit 116 and a processor 118. The battery 112 can include, for example, one or more cells 122 for storing a charge and a memory 120. In one arrangement, the memory 120 of the battery 112 can be an electrically erasable programmable read only memory, although other suitable types of memory can be used with the battery 112.

The current control circuit 116 of the charging unit 110 can include, for example, a sense resistor $R_S$, a field effect transistor (FET) 124 and a diode 126. As shown in FIG. 1, inputs to the processor 118 can be positioned on either side of the sense resistor $R_S$, and the processor 118 can control the operation of the FET 124. The output of the current control circuit 116 can lead to a B+ contact, which can be coupled to the cells 122 of the battery 112. An input from the B+ contact can also be coupled to the processor 118. The negative side of the cells 124 can be coupled to a B− contact, which can be coupled to a ground terminal in the charging unit 110. In addition, data can be transferred between the processor 118 and the memory 120 through a Data contact. Examples of the type of data that can be exchanged between the processor 118 and the memory 120 will be presented later.

The battery 112 can also include a thermistor $R_T$, and, as is known in the art, the processor 118 can measure temperature readings from the thermistor $R_T$ through a thermistor $R_T$ contact. The charging unit 110 can further include a pull-up resistor $R_1$ coupled to a power supply $V_S$ to enable the processor 118 to measure the temperature readings generated by the thermistor $R_T$. Although not shown, the processor 118 can include analog-to-digital (A/D) converters and input/outputs (I/O), which, as those of ordinary skill in the art will appreciate, can enable the processor 118 to receive and process the information being generated from the components described above.

In operation, when the battery 112 is coupled to the charging unit 110 and the power supply 114 is coupled to the charging unit 110, charging current can flow from the power supply 114 to the battery 112 through the charging unit 110. The processor 118 of the charging unit 110 can access from the memory 120 and through the Data contact charging data concerning the battery 112. The processor 118 can monitor the charging current that is being transferred to the battery 112 from the sense resistor $R_S$ inputs and the voltage on the battery 112 through the input from the B+ contact. Based on the accessed data and the inputs from the sense resistor $R_S$ and the B+ contact, the processor 118 can control the flow of charging current to the battery 112. During the charging process, the processor 118 can also monitor the temperature of the battery 112 from the thermistor $R_T$ and the thermistor $R_T$ contact. If the temperature rises above a predetermined threshold, the processor 118 can adjust the flow of charging current accordingly.

In one arrangement, the data that the processor 118 can access can concern certain charging parameters that can enable the battery 112 to be charged to a level that is below an initial maximum charging capacity of the battery 112. Once the battery 112 reaches these parameters, the processor 118 can stop the flow of charging current by turning off the FET 124. Charging the battery 112 in accordance with this fashion can help reduce the variation of the capacity of the battery 112 over its life. That is, the capacity of the battery 112, over the course of its lifetime, may appear to be more consistent because the charge capacity of the battery 112 can be restricted below its maximum capacity during an initial phase. This process will be explained in more detail below.

Figure 2:
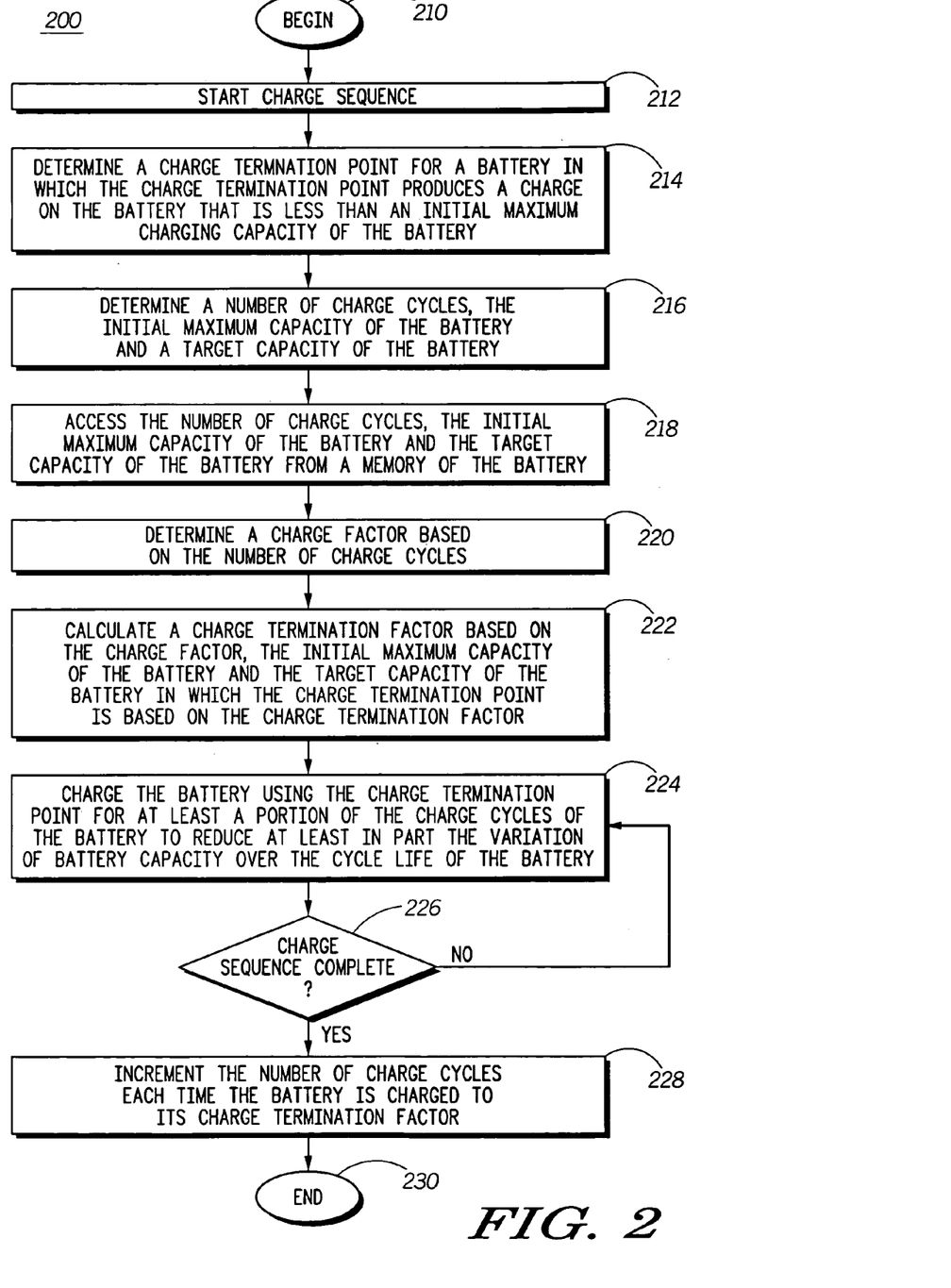
FIG. 2 illustrates a method for charging a battery in accordance with an embodiment of the inventive arrangements.

Referring to FIG. 2, a method 200 for charging a battery is shown. To explain the steps of the method 200, reference will be made to the components described in FIG. 1, although it is understood that the method 200 can be practiced in any other suitable system. At step 210, the method 200 can begin. At step 212, a charge sequence can be initiated. For example, referring to FIG. 1, the battery 112 can be coupled to the charging unit 110, and charging current from the power supply 114 is ready to be supplied to the battery 112 through the charging unit 110.

Referring back to the method 200 of FIG. 2, at step 214, a charge termination point can be determined for a battery in which the charge termination point produces a charge on the battery that is less than an initial maximum charging capacity of the battery. Referring back to FIG. 1 again, as an example, the processor 118 of the charging unit 110 can determine a charge termination point for the battery 112. This charge termination point can cause the battery 112 to be charged to a level that is less than an initial maximum charging capacity of the battery 112. This process can be performed over the life of the battery 112, even when it is new or relatively new. One particular example of how a charge termination point is determined for a battery is illustrated in steps 216–222 of FIG. 2. It is understood, however, that the invention is not limited in this regard, as any other suitable method can be used to determine a charge termination point.

At step 216, a number of charge cycles, an initial maximum capacity of the battery and a target capacity of the battery can be determined. The number of charge cycles, the initial maximum capacity of the battery and the target capacity of the battery can be accessed from a memory of the battery, as shown at step 218.

For example, referring to FIG. 1, the processor 118 of the charging unit 110 can signal the memory 120 of the battery 112 to access the number of charge cycles for the battery 112, the initial maximum capacity of the battery 112 and the target capacity of the battery 112. For purposes of the invention, the initial maximum capacity of the battery can mean the maximum capacity of the battery as originally intended or designed. As an example, this initial maximum capacity can be a parameter of a maximum current output per unit of time, which can be measured in milliamps per hour (mAH). As a more specific example, if a battery was originally designed to output a maximum of 877 mA over a one hour period before being fully discharged, then the initial maximum capacity of the battery can be 877 mAH. It is understood, however, that the invention is not limited to this particular example, as other suitable parameters can serve as the initial maximum capacity. The initial maximum capacity can be programmed into the memory 120.

The target capacity can mean a predetermined capacity that is below the initial maximum capacity. Similar to the initial maximum capacity, the target capacity can be a parameter of a maximum current output per unit of time, which can be measured in mAH. For example, if the initial maximum capacity is 877 mAH, the target capacity can be 750 mAH. Thus, the target capacity can actually be a less-than-whole percentage of the initial maximum capacity. The use of a target capacity during the charging of a battery, because it is lower than the initial maximum capacity, can result in the battery being charged to state that is lower than that typically encountered if the battery were fully charged, i.e., to its initial maximum capacity. It is understood that the target capacity is not limited to this particular example, as other suitable parameters can serve as the target capacity. The target capacity can also be programmed into the memory 120.

The target capacity can be any predetermined value that is below the initial maximum capacity. Although the selection of a value for a target capacity can be completely arbitrary, several factors may be taken into consideration when doing so. For example, the battery may be used to supply power to a mobile communications device. As a result, the selection of the target capacity can be based on one or more of a predetermined percentage of transmission time, a predetermined percentage of receive time and a predetermined percentage of standby time, each of which can be associated with the mobile communications device.

Specifically, the amount of time that the mobile communication unit is typically actively transmitting and receiving or in standby mode as compared to the total time that the user has the unit can be factors in selecting the target capacity. For example, estimates can be made as to the percentage of overall time that a user will be actively transmitting and receiving and in standby mode. For a higher estimated percentage of transmission and receive times, a higher target capacity can be selected. Conversely, for a higher amount of standby time, a lower target capacity can be selected. These estimates can be based on prior usage of the mobile communication unit or similar mobile communication units.

Once a target capacity is selected, it does not need to remain static; if desired, the target capacity can be modified at a later date to coincide with a user's usage of the mobile communication unit. Moreover, the invention is not limited to the examples described above. That is, any other suitable factor can be used to select a target capacity.

The number of charge cycles can mean the number of times that the battery has been charged to capacity. This capacity can be the target capacity as described above. As an alternative, this capacity can be the initial maximum capacity (also described above) if the battery is charged to this value. In addition, a charge cycle can be the process of charging the battery to capacity, whether it's the target capacity or the initial maximum capacity and then subsequently discharging the battery.

Referring back to FIG. 2, at step 220, a charge factor based on the number of charge cycles can be determined. Further, a charge termination factor based on (1) the charge factor, (2) the initial maximum capacity of the battery and the (3) target capacity of the battery can be calculated in which the charge termination point is based on the charge termination factor, as shown at step 222. For example, referring to FIG. 1, the processor 118, once it has accessed the number of charge cycles, can determine a charge factor for the battery 112. The charge factor can be a percentage that indicates the charge capacity of a battery based on the number of charge cycles that the battery has endured.

As an example, if the battery 112 is new, e.g., the number of charge cycles is zero, the charge factor can be 100% or unity. As the battery 112 is charged numerous times, however, this percentage may drop. For example, if the number of charge cycles for the battery 112 is 100, the charge factor may be 97%, or 0.97, which means that the battery, after 100 charge cycles, would typically only be able to be charged to 97% of its original charging capacity. The charge factors can correspond to the number of charge cycles for the battery 112, and these values can be programmed into the processor 118 of the charging unit 110. The number of charge factors can vary such that there may be a stored charge factor for each distinct charge cycle, i.e., a one-to-one basis, or for a periodic fraction of the charge cycles, such as for every fifty charge cycles. The values can be determined based on prior experience with the operation of the battery 112. It must be noted that the invention is not limited to these particular examples, however.

After the charge factor is determined, the processor 118 can calculate a charge termination factor based on the charge factor for the battery 112, the initial maximum capacity of the battery 112 and the target capacity of the battery 112, all of which have been described above. In one particular embodiment, the processor 118 can calculate the charge termination factor by dividing the target capacity by the product of the charge factor and the initial maximum capacity.

For example, assuming that the battery 112 is new (the number of charge cycles is zero), the charge factor can be 100% (see example above). In addition, it may also be assumed that the initial maximum capacity is 877 mAH and that the target capacity is 750 mAH. The charge termination factor (CTF) can be as follows:

$$CTF = (750 \text{ mAH}) / [(100\%)(877 \text{ mAH})] \approx 85.5\% \text{ or } 0.855.$$

In accordance with the inventive arrangements and this example, the battery 112 can be charged to roughly 85.5% of its original capacity when it is new.

As another example, assume that the battery 112 has 100 as the number of its charge cycles, which can mean that the charge factor of the battery 112 is 97% (see example above). Also, assume that the initial maximum capacity is 877 mAH and that the target capacity is 750 mAH. In this example, the CTF can be as follows:

$$CTF=(750\ mAH)/[(97\%)(877\ mAH)]\approx 88.2\%\ or\ 0.882.$$

In this example, the battery 112 can be charged to approximately 88.2% of its original capacity. It can be seen here that the battery 112 can be charged to a higher percentage of its original capacity, which can account for the drop in charging capacity that would become evident after 100 charging cycles. In this way, the user experiences a more consistent charge capacity because the drop in overall charge capacity of the battery 112 is compensated by the increase in the CTF.

Once the CTF is determined, the processor 118 can determine the charge termination point(s) based on the CTF. As an example, the charge termination points can be a termination charge voltage and/or a charge current termination point, and these values can serve as a guideline for charging the battery 112 to the CTF. These values can cause the battery 112 to be charged to a level that is lower than the initial charging capacity of the battery 112. It is important to note that any suitable values for the termination charge voltage and the charge current termination point can be stored in the processor 118 and can be used for charging the battery 112 to such a level.

The termination charge voltage can be the voltage to which it is desired to charge the battery, and the charge current termination point can be the value of the charging current at which charging of the battery can cease. As will be explained later, the termination charge voltage may be less than or equal to the maximum charge voltage of the battery 112. Also, the charge current termination point may be greater than or equal to the current value at which the battery 112 normally ceases charging, i.e., the current value when the battery 112 stops charging if the battery 112 was going to be charged to full capacity.

Values of termination charge voltages and charge current termination points that correspond to CTFs can be programmed into and stored in the processor 118. For example, for a CTF of 0.885 (85.5%), the termination charge voltage and the charge current termination point that may be used to charge the battery 112 to this capacity can be 4.2 volts and 327 mA, respectively, and these values can be stored in the processor 118. It must be noted, however, that the invention is in no way limited to these particular examples, as other suitable values can be used to attain a CTF of 88.5%.

Similarly, if the CTF is 0.882, the termination charge voltage can be 4.2 volts and the charge current termination point can be 275 mA, and these values can also be stored in the processor 118. It can be seen that a lower charge current termination point may be needed for a CTF of 0.882 because the battery 112 is to be charged to a higher capacity here. Again, other suitable values for the termination charge voltage and the charge current termination point can be employed. This process will be further described below.

Referring back to the method 200 of FIG. 2, at step 224, the battery can be charged using the charge termination point for at least a portion of the charge cycles of the battery to reduce at least in part the variation of battery capacity over the cycle life of the battery. For example, referring to FIG. 1, the processor 118, once it has determined the charge termination point, can control the charging of the battery 112. Specifically, the processor 118 can monitor the sense resistor $R_S$ inputs and, using the charge termination point(s), can correspondingly adjust the charge current to the battery 112 by manipulating the FET 124. Examples of this process will be presented below.

Figure 3:
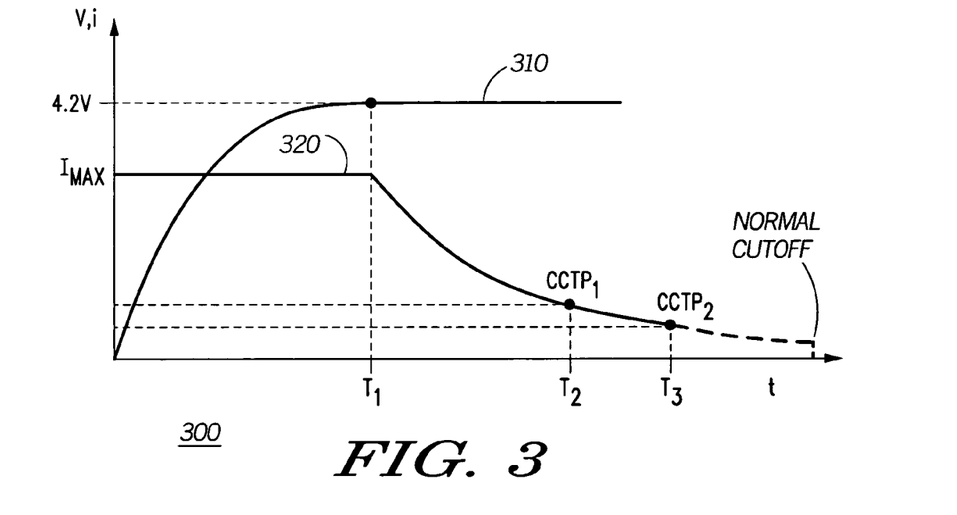
FIG. 3 illustrates a graph representing the charging of a battery in accordance with an embodiment of the inventive arrangements.
Figure 4:
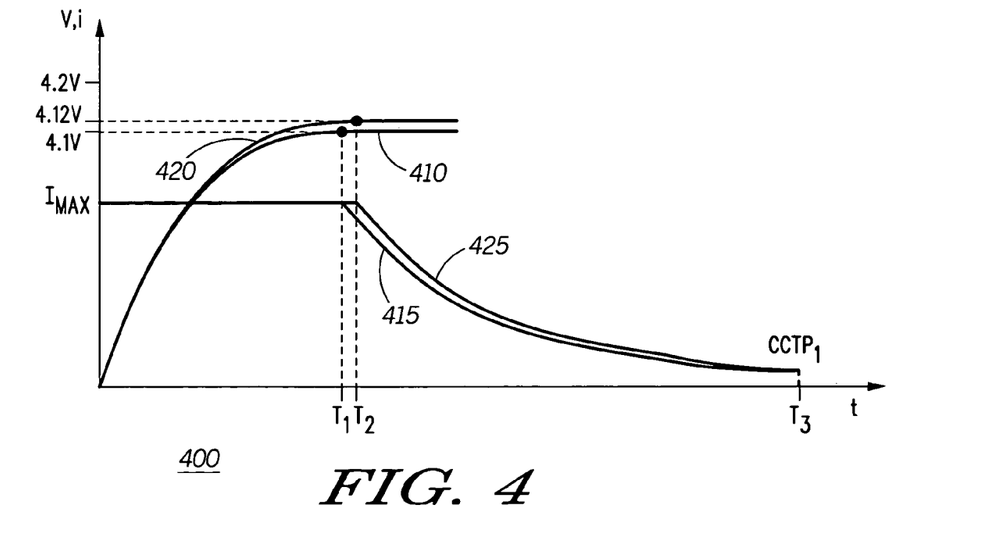
FIG. 4 illustrates another graph representing the charging of a battery in accordance with an embodiment of the inventive arrangements.
Figure 5:
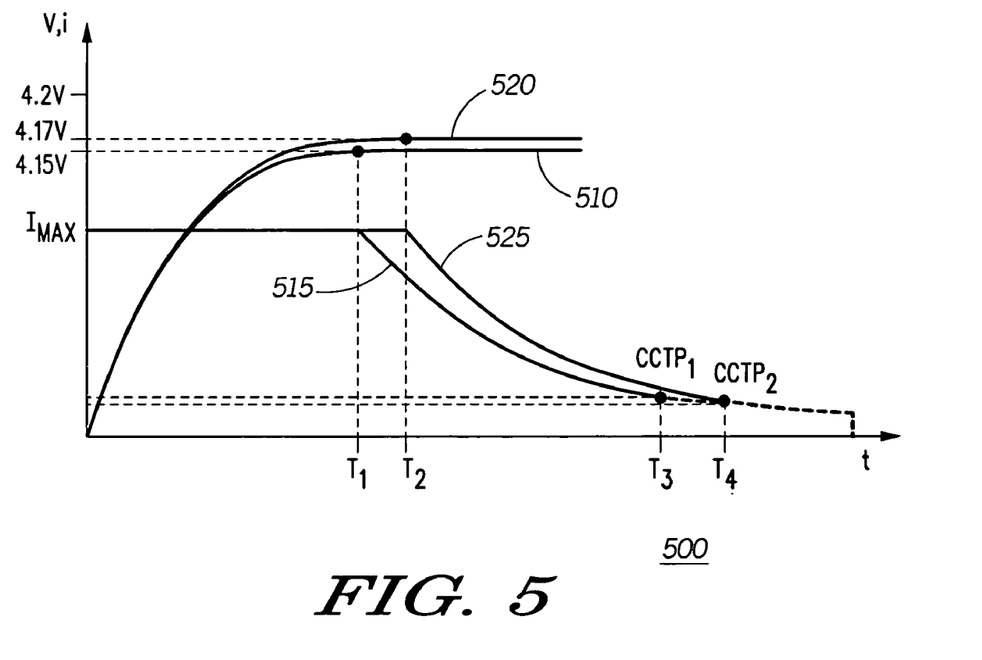
FIG. 5 illustrates yet another graph representing the charging of a battery in accordance with an embodiment of the inventive arrangements.

Referring to FIGS. 3–5, several graphs are shown that illustrate examples of how a battery can be charged. Referring to FIG. 3, a charging graph 300 is shown having a voltage curve 310 and a current curve 320 (voltage and current vs. time). In this example, the charge termination point of the battery can be a charge current termination point (CCTP) and the battery can be new, i.e., the number of charge cycles can be zero. In accordance with the above example, the CCTP can have a value of 327 mA and a termination charge voltage of 4.2 volts, which can also equal the maximum charge voltage of the battery.

The battery can be initially charged with a charge current $I_{MAX}$, or the maximum current rating of the battery, as those of ordinary skill in the art will appreciate. As is also known in the art, when the maximum charge voltage of the battery reaches 4.2V (represented by time=$T_1$), the charge current can decrease accordingly. When the charge current reaches a first CCTP ($CCTP_1$) of 327 mA (represented by time=$T_2$), the charging of the battery can stop. Alternatively, if the battery has endured 100 charging cycles, then, in accordance with the examples described above, the CCTP can be 275 mA, or $CCTP_2$ (represented by time=$T_3$). In either arrangement, the charge current can be terminated before it reaches the normal cutoff point (this path is represented by a broken line).

In accordance with the inventive arrangements, the battery is not completely charged to capacity. When the battery is new or relatively new, the level to which the battery is charged can be lower than the initial maximum charging capacity of the battery. This level of charge, however, can still provide enough power to electronic devices to satisfy most users. As the number of charging cycles that the battery undergoes increases, the battery can be charged to a level higher than when it was new or relatively new (but the level of charge can still remain below the initial maximum charging capacity). This increase in charge can compensate for the decrease in battery capacity due to the increased number of charging cycles. As a result, the user experiences little or no variation in the capacity of the battery over the cycle life of the battery (a cycle life of the battery can mean the number of charge cycles that the battery can undergo before it fails to provide a sufficient amount of capacity, which can be set by the manufacturer of the battery or any other suitable entity).

It is understood, however, that the invention is not limited to the example described above. For example, the termination charge voltage can be less than the maximum charge voltage. Such an example is illustrated in FIG. 4, which shows a graph 400 having a first voltage curve 410 and a corresponding first current curve 415 and a second voltage curve 420 curve and a corresponding second current curve 425. Here, the charge termination points for a new battery (zero charge cycles) can be, for example, around 4.1 volts (represented by time=$T_1$) for the termination charge voltage and, for example, roughly 50 mA for the CCTP, (represented by time=$T_3$), which are reflected on the first voltage curve 410 and the first current curve 415. In this case, the charge current termination point can be equal to the charge current value at which charging normally stops, such as 50 mA.

In addition, for a battery that has endured 100 charge cycles, the termination charge voltage can increase slightly to, for example, 4.12 volts (represented by time=$T_2$), and the charge current termination point can remain at CTTP, (represented by time=$T_3$), or 50 mA in this case. This example illustrates how the termination charge voltage can be varied to account for the decrease in battery capacity after the battery has gone through numerous charge cycles.

Referring to FIG. 5, a graph 500 is shown that illustrates how both the termination charge voltage and the charge current termination point can both be varied over the course of the life of a battery. The graph 500 can include a first voltage curve 510 and a corresponding first current curve 515 and a second voltage curve 520 and a corresponding second current curve 525. As an example, for a new battery, the termination charge voltage can be 4.15 volts (less than the maximum charge voltage of 4.2 volts and represented by time=$T_1$) and the charge current termination point can be 175 mA (higher than the normal current cutoff point and represented by $CCTP_1$ and time=$T_3$). Again, charging a battery in accordance with these values will cause the battery to be charged to a capacity that is less than maximum capacity.

If the battery has endured 100 charging cycles, the termination charge voltage can increase to, for example, 4.17 volts (represented by time=$T_2$) and the charge current termination point can decrease to, for example, 150 mA (represented by $CCTP_2$ and time=$T_4$). Similar to the examples described above, the increase in the termination charge voltage and the decrease in the charge current termination point can account for the drop in the capacity of the battery following the 100 charging cycles.

Although FIGS. 3–5 have been used to describe how the inventive method can work, it is understood that the invention is not limited to these examples. Any other suitable values for the termination charge voltage and the charge current termination point can be selected for charging the battery to a reduced capacity (e.g., to the percentage represented by the charge termination factor). Although it has been noted that these values can be stored in a processor of a charging unit, they may be stored and accessed from any other suitable device.

It is also understood that the charge termination factor and the charge termination points that are determined for a particular battery can be used for at least a portion of the charge cycles for a battery. For example, once such values are acquired, they may be used to charge the battery for the next fifty or so charge cycles. Of course, new values can be determined each time a battery is to be charged, too.

Referring back to the method 200 of FIG. 2, at decision block 226, it can be determined whether the charge sequence is complete. If it is not, the method 200 can resume at step 224. If the charging sequence is finished, however, the method 200 can flow to step 228. At step 228, the number of charge cycles can be incremented each time the battery is charged to its charge termination factor. The method 200 can then end at step 230.

Concerning the incrementing step 228, reference will made once again to FIG. 1 to demonstrate an example. Once the battery 112 has reached its charge termination factor, the battery 112 may have been charged to a capacity that is below its initial maximum capacity. At this point, the processor 118 can signal the memory 120, and the number of charge cycles can be incremented, for example, by one. The number of charge cycles can also be incremented, for example, by one of the battery is charged to a level above the charge termination factor. In addition, those of ordinary skill in the art will appreciate that the number of charge cycles can be incremented by a number that is less than one, particularly if the battery is not charged to at least its charge termination factor.

In addition, while the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A method for charging a battery, comprising the steps of:
   determining a charge termination point for the battery, wherein the charge termination point produces a charge on the battery that is less than an initial maximum charging capacity of the battery; and
   charging the battery using the charge termination point for at least a portion of the charge cycles of the battery to reduce at least in part the variation of battery capacity over the cycle life of the battery;
   wherein the charge termination point is at least partially based on a percentage of transmission time, a percentage of receive time or a percentage of standby time, each of which is associated with a mobile communications device.

2. The method according to claim 1, wherein the step of determining a charge termination point for the battery comprises the steps of:
   determining a number of charge cycles, an initial maximum capacity of the battery and a target capacity of the battery;
   determining a charge factor based on the number of charge cycles; and
   calculating a charge termination factor based on the charge factor, the initial maximum capacity of the battery and the target capacity of the battery, wherein the charge termination point is based on the charge termination factor.

3. The method according to claim 1, wherein the charge termination point is a termination charge voltage or a charge current termination point.

4. The method according to claim 2, further comprising the step of accessing the number of charge cycles, the initial maximum capacity of the battery and the target capacity of the battery from a memory of the battery.

5. The method according to claim 4, wherein the memory is an electrically erasable programmable read only memory.

6. The method according to claim 2, further comprising the step of incrementing the number of charge cycles each time the battery is charged to its charge termination factor.

7. A system for charging a battery, comprising:
   a battery; and
   a charging unit having a processor, wherein the processor is programmed to determine a charge termination point for the battery, wherein the charge termination point produces a charge on the battery that is less than an initial maximum charging capacity of the battery;
   wherein the charging unit charges the battery using the charge termination point for at least a portion of the charge cycles of the battery to reduce at least in part the variation of battery capacity over the cycle life of the battery;
   wherein the charge termination point is at least partially based on a percentage of transmission time, a percentage of receive time or a percentage of standby time, each of which is associated with a mobile communications device.

8. The system according to claim 7, wherein the processor is programmed to determine the charge termination point for the battery by:
   determining a number of charge cycles, an initial maximum capacity of the battery and a target capacity of the battery;
   determining a charge factor based on the number of charge cycles; and
   calculating a charge termination factor based on the charge factor, the initial maximum capacity of the battery and the target capacity of the battery, wherein the charge termination point is based on the charge termination factor.

9. The system according to claim 7, wherein the processor is further programmed to select the charge termination point from a termination charge voltage or a charge current termination point.

10. The system according to claim 8, wherein the battery comprises a memory and wherein the processor is further programmed to access the number of charge cycles, the initial maximum capacity of the battery and the target capacity of the battery from the memory of the battery.

11. The system according to claim 10, wherein the memory is an electrically erasable programmable read only memory.

12. The system according to claim 8, wherein the processor is further programmed to increment the number of charge cycles each time the battery is charged to its charge termination factor.

13. A battery for supplying power to an electronic device, comprising:
   at least one cell for receiving power from a charging unit; and
   a memory, wherein when the battery is coupled to the charging unit, a processor of the charging unit is programmed to determine a charge termination point for the battery, wherein the charge termination point produces a charge on the battery that is less than an initial maximum charging capacity of the battery and wherein the charging unit charges the battery using the charge termination point for at least a portion of the charge cycles of the battery to reduce at least in part the variation of battery capacity over the cycle life of the battery;
   wherein the charge termination point is at least partially based on a percentage of transmission time, a percentage of receive time or a percentage of standby time, each of which is associated with a mobile communications device.

14. The battery according to claim 13, wherein the memory is an electrically programmable read only memory that stores a number of charge cycles, an initial maximum capacity and a target capacity of the battery and wherein the processor accesses the number of charge cycles, the initial maximum capacity and the target capacity of the battery to determine the charge termination point.

15. A charging unit for charging a battery, comprising:
   a charge control circuit for controlling charging current to the battery; and
   a processor, wherein the processor is programmed to determine a charge termination point for the battery, wherein the charge termination point produces a charge on the battery that is less than an initial maximum charging capacity of the battery;
   wherein the charging unit charges the battery using the charge termination point for at least a portion of the charge cycles of the battery to reduce at least in part the variation of battery capacity over the cycle life of the battery;
   wherein the charge termination point is at least partially based on a percentage of transmission time, a percentage of receive time or a percentage of standby time, each of which is associated with a mobile communications device.

16. The charging unit according to claim 15, wherein the processor is programmed to determine the charge termination point for the battery by:
   determining a number of charge cycles, an initial maximum capacity of the battery and a target capacity of the battery;
   determining a charge factor based on the number of charge cycles; and
   calculating a charge termination factor based on the charge factor, the initial maximum capacity of the battery and the target capacity of the battery, wherein the charge termination point is based on the charge termination factor.

* * * * *